(12) United States Patent
Henry et al.

(10) Patent No.: US 6,834,126 B1
(45) Date of Patent: Dec. 21, 2004

(54) METHOD OF MODIFYING THE GEOMETRIC ORIENTATION OF AN IMAGE

(75) Inventors: Félix Henry, Rennes (FR); Bertrand Berthelot, Rennes (FR); Maryline Charrier, Rennes (FR); Eric Majani, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 754 days.

(21) Appl. No.: 09/587,191

(22) Filed: Jun. 2, 2000

(30) Foreign Application Priority Data

Jun. 17, 1999 (FR) .......................................... 99 07675

(51) Int. Cl.$^7$ ................................................ G06K 9/36
(52) U.S. Cl. ................................................ 382/276
(58) Field of Search .............................. 382/232, 236, 382/238, 248, 250; 358/432, 433; 348/384.1, 394.1, 395.1, 400.1–404.1, 407.1, 416.1, 420.1–421.1, 425.2, 430.1, 431.1; 375/240.02–240.03, 240.11–240.16, 240.18–240.2, 240.22–240.25; 341/51, 63, 65, 67, 79, 107; 708/203, 300, 307–308, 313, 316–317, 400–405

(56) References Cited

U.S. PATENT DOCUMENTS

| | | | | |
|---|---|---|---|---|
| 5,799,100 A | * | 8/1998 | Clarke et al. | 382/132 |
| 5,841,890 A | * | 11/1998 | Kraske | 382/131 |
| 5,867,598 A | | 2/1999 | de Queiroz | 382/235 |
| 5,900,909 A | | 5/1999 | Parulski et al. | 348/232 |
| 5,982,917 A | * | 11/1999 | Clarke et al. | 382/132 |
| 6,393,155 B1 | * | 5/2002 | Bright et al. | 382/248 |
| 6,459,816 B2 | * | 10/2002 | Matsuura et al. | 382/248 |
| 6,480,631 B2 | * | 11/2002 | So et al. | 382/248 |
| 6,505,299 B1 | * | 1/2003 | Zeng et al. | 713/160 |
| 6,631,364 B1 | * | 10/2003 | Rioux et al. | 707/2 |

FOREIGN PATENT DOCUMENTS

EP      0982931      3/2000      ............ H04N/1/41

\* cited by examiner

*Primary Examiner*—Jose L. Couso
(74) *Attorney, Agent, or Firm*—Fitzpatrick, Cella, Harper & Scinto (57) ABSTRACT

A method of modifying the geometric orientation of a digital image in an image acquisition apparatus adapted to acquire an image in one amongst several different orientations and to store said image in the form of a compressed file, comprises the steps of acquiring an image in a chosen orientation; identifying the chosen orientation; converting said image into a digital image; spectral transformation (E10) of the digital image, determination (E12–E15) of a geometric transformation to be applied to the image acquired as a function of the chosen orientation; application (E16–E18) of the geometric transformation determined to symbols associated with spectral coefficients issuing from the spectral transformation; recording (E20), in the compressed file, two indicators representing a normal or reverse order of the symbols respectively in two directions of the digital image; and coding (E21) of the digital image in the compressed file.

Use notably in a digital photographic apparatus.

30 Claims, 5 Drawing Sheets

METHOD OF MODIFYING THE GEOMETRIC ORIENTATION OF AN IMAGE

The present invention concerns a method and device for modifying the geometric orientation of a digital image.

It concerns more particularly the geometric transformation of an image in an image acquisition apparatus, such as a digital photographic apparatus or a digital camera, which can take images in different orientations, and then store them in a compressed data file before they are displayed.

In this type of apparatus, photographs or images can be taken in several different orientations, according to the position of the appliance with respect to the object to the photographed.

There are generally distinguished at least one so-called "landscape" orientation, in which the apparatus is placed horizontally, and a so-called "portrait" orientation, in which the apparatus is placed vertically.

Generally, the images thus taken in different orientations are stored in a compressed file in a single orientation, then subsequently displayed on a screen, integrated or not into the apparatus. It is then necessary to modify the orientation of the display screen according to the orientation of the images, notably by rotating the apparatus or display screen through 90 degrees.

The document U.S. Pat. No. 5,900,909 describes a digital photographic apparatus which makes it possible to improve the convenience of display of the images taken in different orientations.

For this purpose, it describes an apparatus equipped with an automatic detector for the orientation of the apparatus when the photograph is taken. According to this orientation detection, a rotation of the image is effected in the apparatus, before storing this digital image in a memory of the apparatus and displaying it.

Each image can thus be stored in the apparatus in an orientation allowing convenient display of the image.

In this document, the image is acquired by a CCD (Charge Coupled Device) sensor, and then read by an analogue to digital converter. When the orientation of the image is to be modified, the direction of reading the rows and columns of the signal output from the CCD sensor is modified according to the desired orientation and the value of the width and height of the image are modified, that is to say, as a general rule, reversed.

The present invention proposes a method and device for modifying the geometric orientation of a digital image which effects a rapid modification of the orientation in space of a digital image which is to be coded in a compressed file.

To this end, the present invention relates to a method of modifying the geometric orientation of a digital image in an image acquisition apparatus adapted to acquire an image in one amongst several different orientations and to store said image in the form of a compressed file.

In accordance with the invention, this method comprises the following steps:

acquiring an image in a chosen orientation;
identifying said chosen orientation;
converting said image into a digital image;
spectral transformation of said digital image;
determining a geometric transformation to be applied to said image acquired as a function of the chosen orientation;
applying the geometric transformation determined to symbols associated with spectral coefficients issuing from said spectral transformation;
recording in the compressed file two indicators representing a normal or reversed order of the symbols respectively in two directions of the digital image; and
coding the digital image in said compressed file.

Thus it is particularly advantageous to effect the manipulation and geometric transformation of the digital image in the compressed field on the image, on symbols representing coefficients issuing from a spectral transformation of an image, in order to reduce the calculations and complexity of this operation and to be more efficient in terms of memory consumption.

This geometric transformation of an image can thus be effected at the time of the conventional coding of the image in a compressed data file, after spectral transformation of the digital image, by virtue of the identification of the orientation of the image at the time of acquisition thereof.

The recording of two indicators in the compressed file makes it possible, when the image is decoded, notably for display, to take account of the modification of the order of the spectral coefficients in order to apply a reverse spectral transformation to the digital signal.

Such indicators can for example be updated by alternation of the values 0 and 1 representing respectively a normal or reversed order of the symbols, for each direction of the digital image.

According to a preferred characteristic of the invention, this method of modifying the geometric orientation includes a step of quantizing the spectral coefficients before the step of applying the geometric transformation, said symbols being quantization symbols.

This quantization step is normally used at the time of coding a digital image with loss.

According to another preferred characteristic of the invention, the spectral transformation is a multiresolution spectral decomposition, such as a wavelet spectral decomposition.

In this way a division of the image into frequency signal sub-bands is obtained, which makes it possible to apply a geometric transformation to data areas of smaller sizes than that of the original image.

This characteristic also makes it possible to obtain a saving in time during the geometric transformation of the digital image.

According to one advantageous characteristic of the invention, the step of identifying the chosen orientation is implemented by an automatic orientation detector incorporated in said image acquisition apparatus.

This automatic detection can thus be effected by detecting the position of the apparatus when the image is acquired.

Alternatively, the step of identifying the chosen orientation is implemented by a manual orientation selector incorporated in said image acquisition apparatus.

This selector enables a user to define the position of the apparatus before a photograph is taken.

In both cases, whether the image orientation is identified by an automatic detector incorporated in the apparatus or by a manual selector, this identification makes it possible to indicate, before coding of the image, the orientation of the latter in order to effect, if necessary, a geometric transformation thereof before storing in a compressed data file.

In practice, the image acquisition orientation is chosen from amongst a rotation through 90 degrees, a rotation through 180 degrees or a rotation through 270 degrees.

A photographic apparatus can thus be pivoted in space from its normal position of use without any inconvenience in the taking of the images, which will automatically be stored in the apparatus in a convenient display position.

In a practical implementation of the invention, when the spectral transformation is a multiresolution spectral decomposition, such as a wavelet spectral decomposition, the method of modifying the geometric orientation also comprises a step of transposition of a frequency sub-band having coefficients of low frequency in a first direction of the digital image and of high frequency in a second direction of a digital image with a sub-band with a frequency of the same resolution level in the spectral decomposition, having coefficients of high frequency in said first direction and of low frequency in said second direction when the geometric transformation comprises a rotation through 90 degrees or 270 degrees.

This transposition makes it possible to take into account the changes in direction of the symbols during rotation of an image through 90 or 270 degrees, for example, for a correct application of the digital signal decoding method.

According to another practical characteristic of the invention, the method of modifying the geometric orientation also comprises a step of transposing the values of the height and width of the image when the geometric transformation applied comprises a rotation through 90 degrees or 270 degrees.

Correlatively, the present invention also concerns a device for modifying the geometric orientation of a digital image incorporated in an image acquisition apparatus adapted to acquire an image in accordance with one amongst several different orientations and to store said image in the form of a compressed file, having:

- means of acquiring an image in a chosen orientation;
- means of identifying said chosen orientation;
- means of converting said image into a digital image;
- means of spectral transformation of said digital image;
- means of determining a geometric transformation to be applied to said image acquired as a function of the chosen orientation;
- means of applying the geometric transformation determined to symbols associated with spectral coefficients issuing from said spectral transformation;
- means of recording in the compressed file two indicators representing a normal or reversed order of the symbols respectively in two directions of the digital image; and
- means of coding the digital image in said compressed file.

This geometric orientation modification device has characteristics and advantages similar to those described previously for the geometric orientation modification method according to the invention.

The present invention also concerns an image processing method, comprising the steps of;

- generating image data representing an image;
- wavelet-transforming the image data;
- quantizing the transformed data; and
- entropically encoding the quantized data, characterized in that said method further comprising the steps of:
- identifying a correct orientation of the image represented by the image data, and
- applying a geometric transformation to the transformed data in accordance with the result of the identification.

Thank to this method, the geometric transformation can be performed directly to the transformed data, after identifying the correct orientation of the image.

According to a preferred characteristic of the invention, image data are transformed into sub-bands corresponding to each of a plurality of resolution levels in said wavelet-transforming.

Then, the geometric transformation is performed to the signal sub-bands obtained by a wavelet spectral decomposition.

In practice, the result of the identification is classified in four kinds of cases, that is landscape, inverse landscape, portrait and inverse portrait orientations.

According to a preferred characteristic of the invention, the image processing method comprises a step of storing the information showing the result of the identification and the encoded data.

The present invention also concerns an image acquisition apparatus, a digital photographic apparatus and a digital camera adapted to function in a still image mode having a geometric orientation modification device according to the invention.

It also relates to a storage means or information medium, which can be read by a computer or a microprocessor, incorporated or not into the latter, possibly removable, comprising portions of software codes or program instructions to implement the steps of the geometric orientation modification method or of the image processing method according to the invention, when said storage means or information medium is used by the microprocessor or a computer.

Finally, the present invention also concerns a computer program product, loadable into a processing apparatus, and comprising software code portions adapted to implement the geometric orientation modification method or the image processing method according to the invention.

The advantages of the image acquisition apparatus, the digital photographic apparatus, the digital camera, the storage or information medium means and the computer program product are similar to those of the method which they implement.

Other particularities and advantages of the invention will also emerge from the following description of a preferred embodiment of the invention.

In the accompanying drawings, given by way of non-limitative examples.

A description will be given below of an embodiment of the present invention, in which the method of modifying the geometric orientation of an image is incorporated in a digital photographic apparatus.

Naturally, this method according to the invention could be implemented in a similar fashion in a digital camera adapted to function in a photo mode, or in other words in a mode of taking still images, or in any other digital image acquisition apparatus able to change position during acquisition of such images.

Figure 1:
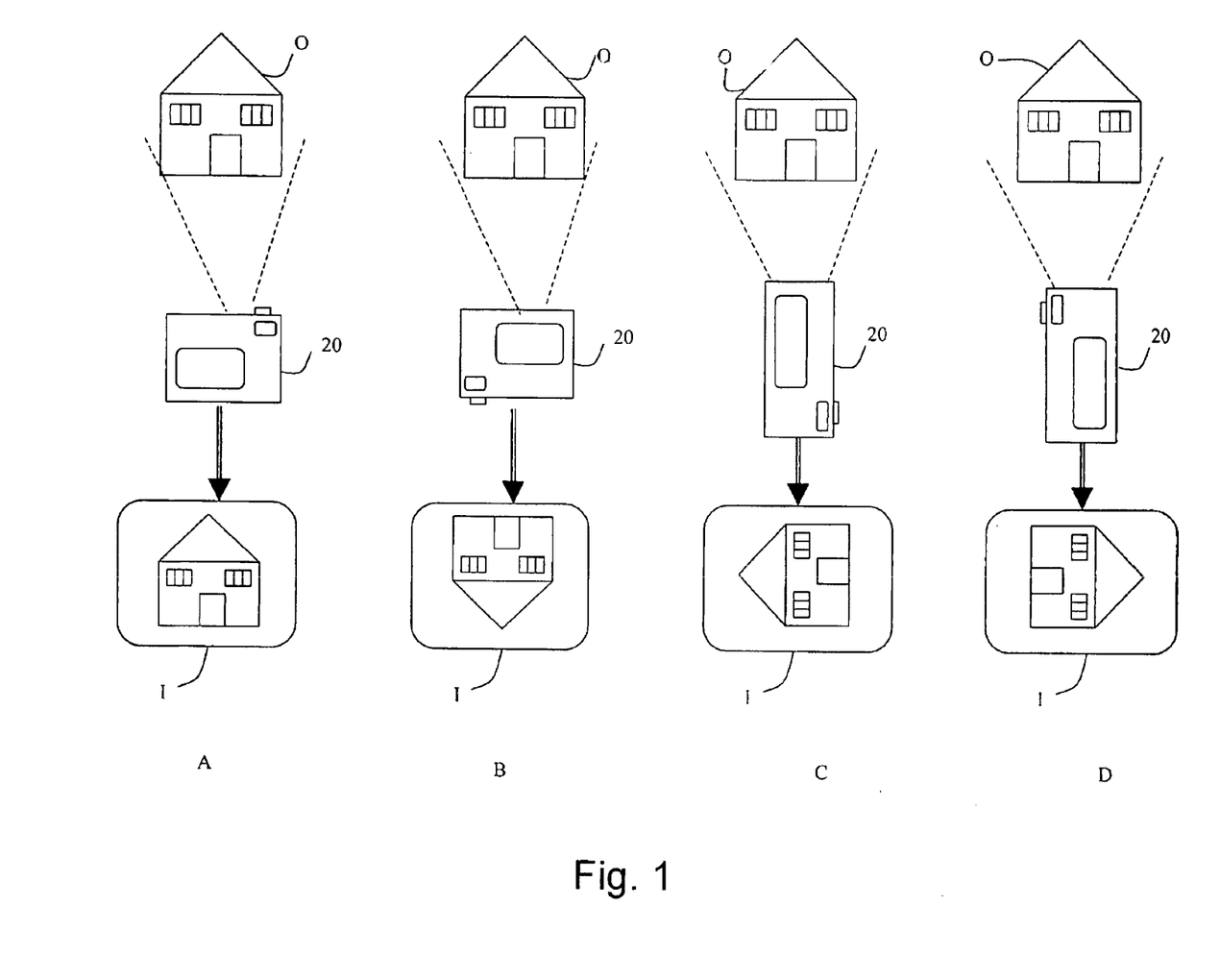
FIG. 1 is a diagram illustrating different possible orientations of an image according to the position of an image acquisition apparatus according to the invention.

FIG. 1 illustrates different cases which can arise when a user wishes to take a photograph of an object O with a photographic apparatus 20 which can occupy several positions in space.

In case A, the apparatus 20 is positioned horizontally, in a normal position of use, identical to the position of the object O. This position corresponds to a so-called "landscape" orientation of the image I obtained by the apparatus 20.

In a second case B, the apparatus is also positioned horizontally, but is inverted with respect to the position of the object O. This position corresponds to a so-called "inverse landscape" orientation of the image I obtained by the apparatus 20. The image I is pivoted through an angle of 180 degrees with respect to the normal display orientation.

In a third case C, the apparatus is positioned vertically and is turned through an angle of 90 degrees to the right with respect to the position of the object O. This position corresponds to a so-called "portrait" orientation of the image I obtained by the apparatus 20. The image is then pivoted through an angle of 90 degrees to the right with respect to the normal display orientation.

Finally, in a fourth case D, the apparatus is positioned vertically and is turned through an angle of 90 degrees to the left with respect to the position of the object O. This position corresponds to a so-called "inverse portrait" orientation of the image I obtained by the apparatus 20. The image is then pivoted through an angle of 270 degrees to the right with respect to the normal display orientation.

In the first case A, the image I can be displayed with correct a orientation on a screen incorporated in the apparatus 20 or on an independent television screen. On the other hand, in the other three cases, it is necessary to modify the orientation of the image I in order to display it correctly.

Figure 2:
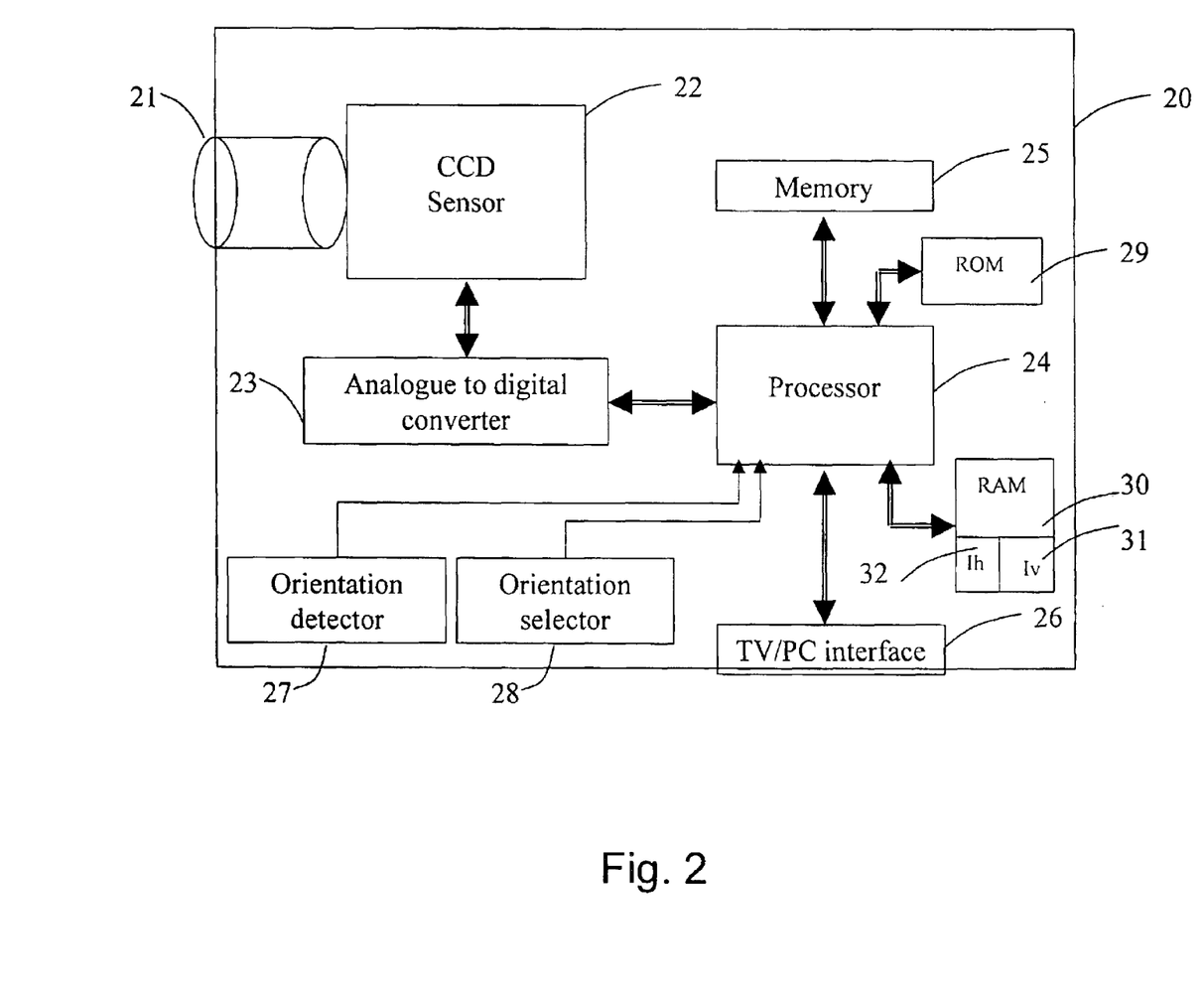
FIG. 2 is a block diagram of a digital photographic apparatus adapted to implement the invention.

For this purpose, the photographic apparatus 20 as illustrated in FIG. 2 incorporates a geometric orientation modification device according to the invention.

This apparatus has means of acquiring an image I in an orientation chosen by the user which depends, as explained above, on the position of the apparatus 20 with respect to the object to be photographed. This image acquisition orientation is chosen here from amongst a rotation through 90 degrees, a rotation through 180 degrees or a rotation through 270 degrees with respect to the normal orientation of the apparatus 20.

To this end, the photographic apparatus 20 has, in a usual fashion, a lens 21 and a grid of CCD sensors 22.

These components are conventional in a digital photographic apparatus and do not need to be described in any more detail here.

It also has, directly in connection with the object of the invention, means of identifying the chosen orientation in which the photograph is taken.

These identification means can comprise an automatic orientation detector 27 incorporated in the apparatus 20.

This orientation detector 27 makes it possible to automatically detect the position of the apparatus 20 with respect to its "normal" position of use.

Examples of orientation detectors are described notably in the document U.S. Pat. No. 5,900,909. It is possible to use, for example, a photoelectric switch in which a ball blocking the light can move along a guide groove, according to the orientation of the apparatus. A pair emitting and receiving light rays is placed at each end of this guide groove in order to detect the orientation of the apparatus in the two opposite vertical positions of the apparatus corresponding to the "portrait" and "inverse portrait" orientations. A similar device could make it possible to distinguish the "landscape" and "inverse landscape" orientations.

Alternatively, the identification means comprise a manual orientation selector 28 incorporated in the apparatus 20, which enables the user to indicate, when the photographic image is taken, the position of the apparatus 20. This selector 28 can be a rotary knob adapted to occupy four positions each corresponding to a position of the apparatus 20 in space.

Naturally, one and the same photographic apparatus 20 can have both an automatic orientation detector and a manual selector for greater flexibility in use.

The apparatus 20 has means of converting the image I into a digital image I comprising a conventional converter 23 adapted to transform analogue signals issuing from the CCD sensors 22 into digital signals.

It also has a processor 24 which makes it possible to effect all the digital processings necessary to the coding of the image and to its geometric transformation according to the invention.

This processor has for this purpose means of spectral transformation of the digital image I, adapted for example to effect a multiresolution spectral decomposition of the image, such as a wavelet spectral decomposition.

By way of example, these spectral decomposition means consist of a conventional set of filters, respectively associated with decimators by two, which filter the image signal in two directions.

The processor 24 also has means of quantizing the spectral coefficients thus obtained, adapted to quantize the spectral coefficients, and coding means adapted for example to effect an entropic coding, of the Huffman coding or arithmetic coding type.

This processor 24 also has means of determining the geometric transformation to be applied to the required image I according to the orientation identified by the detector 27 or selector 28.

It also has, for effecting this geometric transformation of the image, which is here a rotation through 90, 180, or 270 degrees, means of applying the geometric transformation to symbols associated with the spectral coefficients issuing from said spectral transformation, such as, for example, quantization symbols.

Mean of recording, in the compressed file adapted to store the coded image I, two indicators Ih, Iv representing a normal or reversed order of the symbols respectively in the horizontal and vertical directions of the digital image I, are also incorporated in the processor 24.

In addition, the processor 24 also incorporates means of transposing a frequency sub-band having coefficients of low frequency in a first direction of the digital image and of high frequency in a second direction of a digital image with a frequency sub-band of the same resolution in the spectral decomposition, having coefficients of high frequency in said first direction and low frequency in second direction. This transposing is effected when the geometric transformation applied comprises a rotation through 90 degrees or 270 degrees.

The processor 24 also comprises means of transposing the values of the height and width of the image when the geometric transformation applied comprises a rotation through 90 degrees or 270 degrees.

The functioning of all these means will be understood better hereinafter in the description of the geometric orientation modification method which they implement.

The photographic apparatus 20 also has a read only memory (ROM) containing the program for modifying the geometric orientation of a digital image I, and a random access memory (RAM) having registers adapted to record variables modified during the running of this program.

In particular, it contains a register 31 for storing the indicator Iv relating to the vertical direction of the image I and a register 32 for storing the indicator Ih relating to the horizontal direction of the image I.

A non-volatile memory 25 also makes it possible to store, in compressed form, the digital images I possibly associated with the value of the indicators Ih and Iv of modification of the order of the coefficients in the two directions of the image.

The processor 24 will execute the instructions relating to the implementation of the invention, instructions stored in the read only memory 29. On powering up, the programs and methods stored in one of the non-volatile memories of the apparatus 20 are transferred into the random access memory 30, which will then contain the executable code of the invention.

As a variant, the orientation modification programs and methods can be stored on a removable diskette, the apparatus 20 then including a suitable disk drive.

Naturally, the diskettes can be replaced by any information medium such as CD-ROM or memory card.

A communication bus allows, in a conventional manner, communication between the elements of the apparatus 20 or connected to it. In particular, the processor 24 is able to communicate instructions to any sub-element of the apparatus 20 or by means of another sub-element of the apparatus 20.

An interface 26 makes it possible to transmit the images, compressed or not, to a computer or to a television set (not shown), notably in order to display them.

Naturally, the photographic apparatus 20 could also have an integrated display screen for the stored images, or the liquid crystal display (LCD) type.

A description will now be given, with reference to FIGS. 3 to 6, of the geometric orientation modification method in one embodiment of the invention. This method includes first of all a step E1 of acquiring an image I in a chosen orientation.

For this purpose, the users presses, for example, on a shutter release (not shown) on the photographic apparatus 20 placed in a chosen position, for example the vertical position corresponding to case C illustrated in FIG. 1, in which the images are taken in a "portrait" mode.

Figure 3:
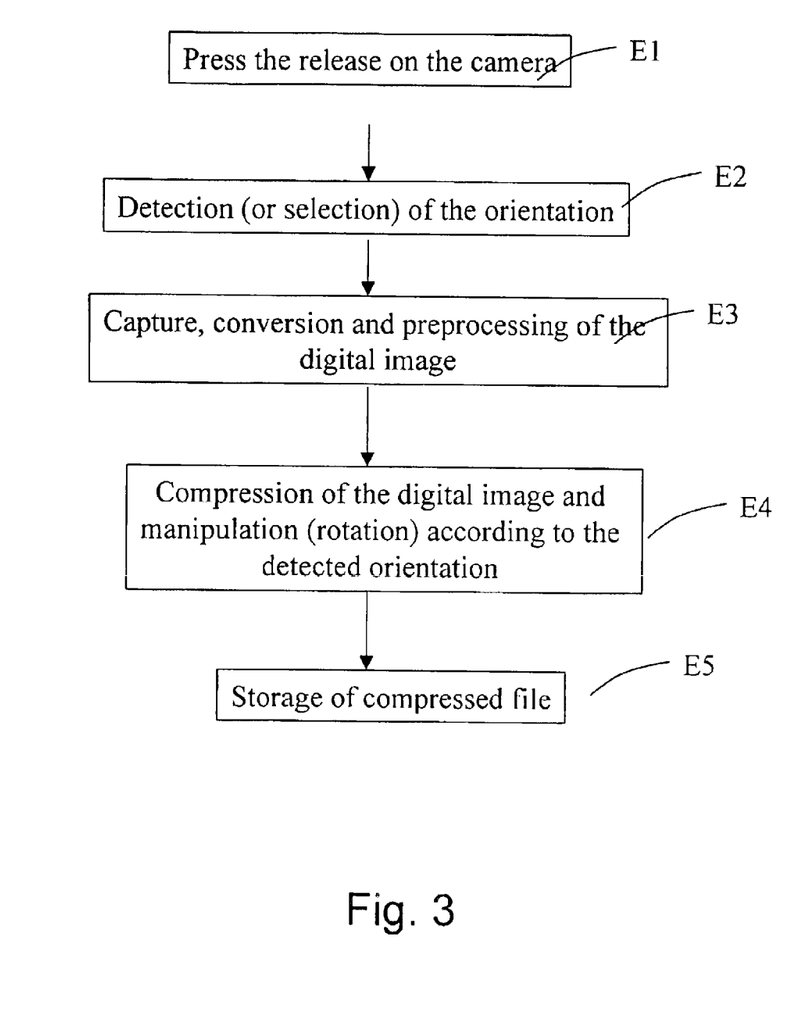
FIG. 3 is a general algorithm of the geometric orientation modification method according to one embodiment of the invention.

A step E2 of identifying the chosen orientation is then implemented, either by means of automatic detector, or by means of the manual selector 28.

In all cases, an item of information indicating the image I is turned through an angle of 90 degrees to the right is recorded in the apparatus 20.

The conventional operations of capturing the analogue image and converting this image into a digital signal are then performed in a processing step E3. Other processings of the image, peculiar to the photographic apparatus 20, could also be effected at this same step E3.

A step E4 of compressing the digital image I is then implemented in order to store this compressed image in a file during a storage step E5.

In accordance with the invention, the geometric manipulation, which is here a rotation of the image 1 through 90 degrees to the left, is effected during the compression step E4.

Figure 4:
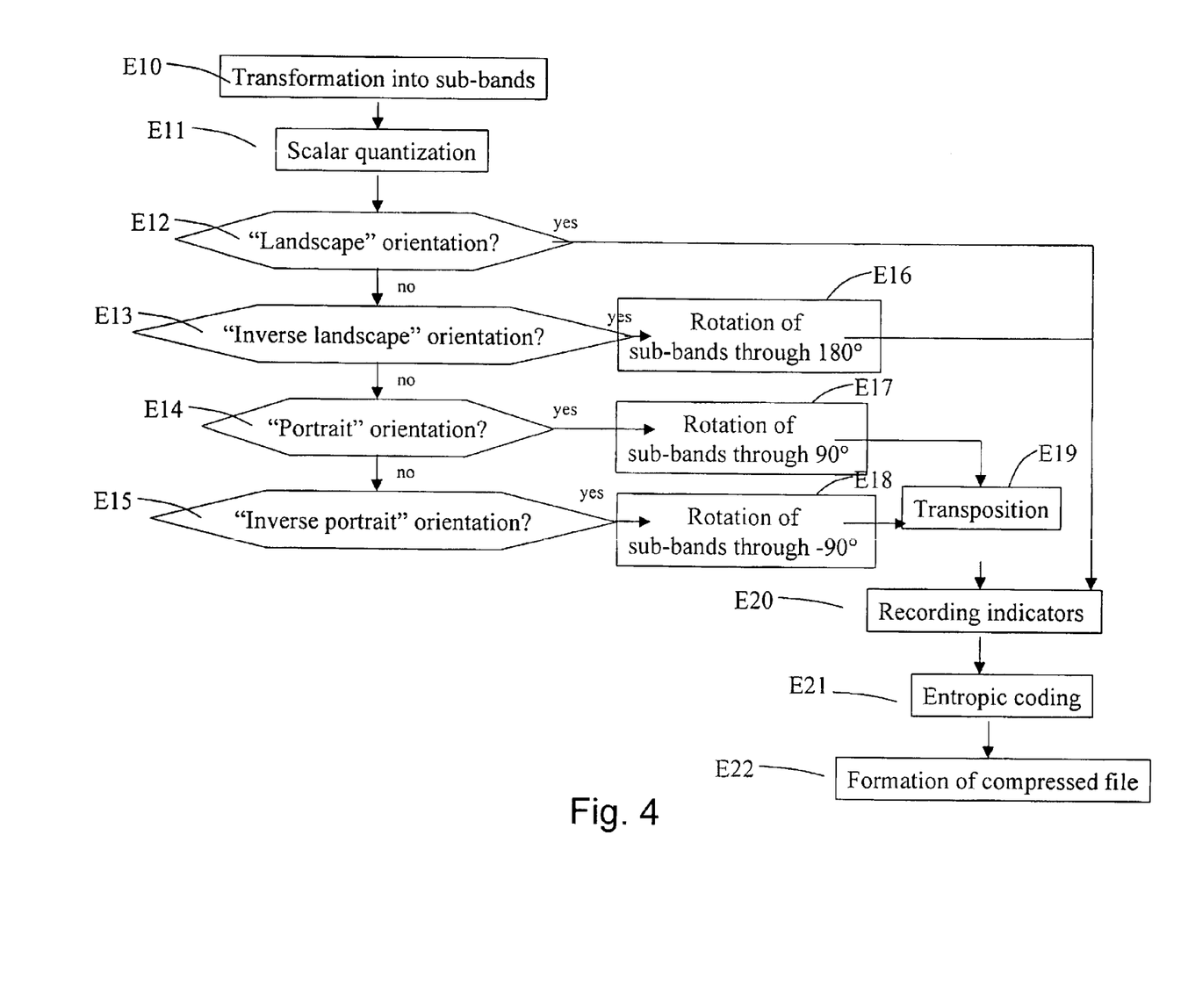
FIG. 4 is an algorithm detailing the geometric orientation modification method according to one embodiment of the invention.

This step is detailed, according to an embodiment which is in no way limitative, in FIG. 4.

It includes first of all a step of spectral transformation E10 of the digital image I.

In this example, the spectral transformation is a multi-resolution spectral decomposition, such as a wavelet spectral decomposition.

Figure 5:
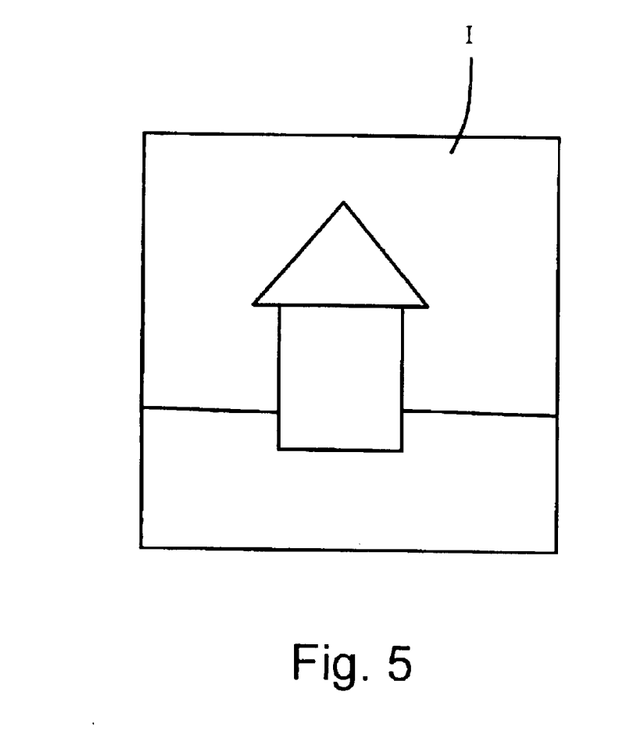
FIGS. 5 and 6 illustrate a spectral decomposition of an image into frequency sub-bands.
Figure 6:
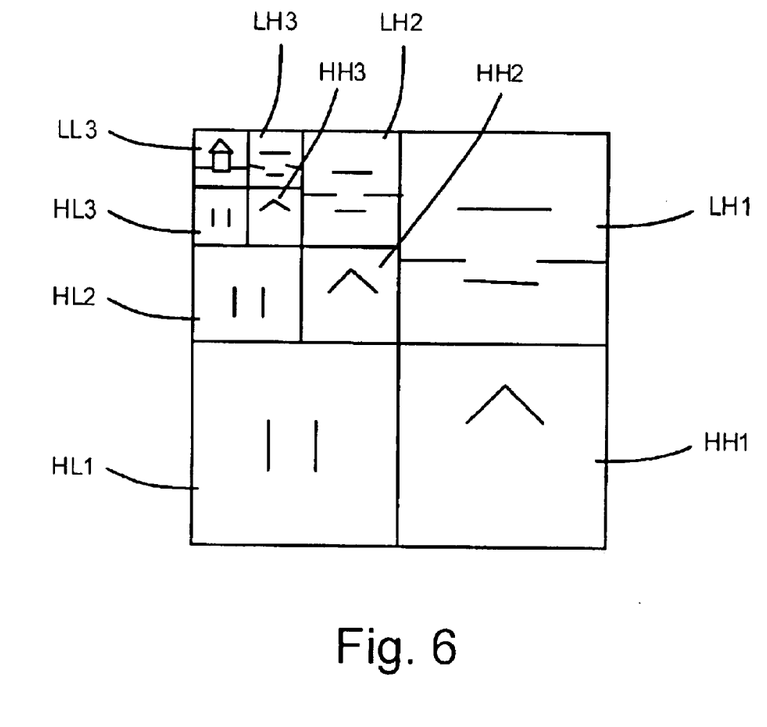

Such a spectral decomposition into frequency sub-bands of the image I is illustrated schematically in FIGS. 5 and 6, for example at a decomposition level of 3.

This spectral decomposition is entirely conventional in digital image compression, and only the principle is stated here.

The digital image, of dimension 2, is formed by a series of digital samples. These digital samples are for example bytes, each byte value representing a pixel of an image.

The digital signal thus formed is filtered through two digital filters, respectively low pass and high pass, in a first direction, for example horizontal. After passing through decimators by two, the resulting filtered signals are in their turn filtered by two filters, respectively low pass and high pass, in a second direction, for example vertical. Each signal is once again passed through a decimator by two. There are then obtained, at the output of this first analysis unit, four sub-bands $LL_1$, $LH_1$, $HL_1$ and $HH_1$ of the highest resolution in the decomposition.

The sub-band $LL_1$ includes the components of low frequency in the two directions of the image signal I. The sub-band $LH_1$ includes the components of low frequency in a first direction and of high frequency in a second direction of the image signal I. The sub-band $HL_1$, includes the components of high frequency in a first direction and the components of low frequency in a second direction. Finally, the sub-band $HH_1$, includes the components of high frequency in both directions.

A second analysis unit filters in its turn the sub-band $LL_1$, in order to supply in the same way four sub-bands $LL_2$, $LH_2$, $HL_2$ and $HH_2$ of an intermediate resolution level in the decomposition level. Finally, in this example, the sub-band $LL_2$ is in its turn analysed by a third analysis unit in order to supply four sub-bands $LL_3$, $LH_3$, $HL_3$ and $HH_3$ of the lowest resolution in this decomposition.

In this way ten sub-bands and three resolution levels are obtained. Naturally, the number of resolution levels, and consequently of sub-bands, can be chosen differently, and can for example be equal to four resolution levels with thirteen sub-bands.

The method according to the invention includes here a step E11 of quantization, for example a normal scalar quantization, of the spectral coefficients obtained by spectral decomposition.

This step E11 of quantization of the spectral coefficients is performed here before the application of the required geometric transformation.

Successive steps E12 to E15 make it possible to determine the geometric transformation to be applied to the acquired image I as a function of the chosen orientation.

It is first of all verified, in a test step E12, whether the orientation chosen to take the image I corresponds to "landscape" mode.

In the affirmative, compression of the image continues without geometric transformation of the image.

In the negative, it is verified, in a second test step E13, whether the chosen orientation corresponds to "inverse landscape" mode.

In the affirmative, it is deduced therefrom that a rotation through 180 degrees must be applied to the image I.

Otherwise, a third test step E14 makes it possible to determine whether the chosen orientation corresponds to "portrait" mode.

In the affirmative, it is deduced therefrom that a rotation through 90 degrees must be applied to the image I.

Otherwise, a fourth test step E15 makes it possible to verify, or to deduce by elimination, that the chosen orientation corresponds to "inverse portrait" mode and to deduce therefrom that a rotation through 270 degrees (or −90 degrees) must be applied to the image I.

Naturally, the order of the test steps E12 to E15 is given here byway of non-limitative example and can be modified.

There is then applied, if necessary, in steps E16, E17, E18, the geometric transformation determined on symbols associated with the spectral coefficients.

Here, the geometric transformation is applied in the frequency sub-bands, directly on the quantization symbols.

A rotation through 90 degrees over all these symbols is then effected in this example, in a step E17.

In this case, the rotation through 90 degrees having the effect of reversing the vertical and horizontal directions, a step E19 of transposition of the frequency sub-bands having coefficients of low frequency in a first direction of the digital image and high frequency in a second direction of the digital image with frequency sub-bands of the same resolution level in the spectral decomposition, having coefficients of high frequency in this first direction and low frequency in the second direction, is implemented.

In practice, here, in the decomposition as illustrated in FIG. 6, the sub-bands $HL_1$ and $LH_1$, $HL_2$ and $LH_2$, and $HL_3$ and $LH_3$ are transposed.

Naturally, this transposition of the sub-bands is also required when the geometric transformation to be applied is a rotation through 270 degrees.

The transposition step E19 is also adapted to update the width and height of the image I in the compressed file, the height and width being transposed when the image is pivoted through 90 or 270 degrees.

In addition, where the quantization step E11 described previously includes a quantizer which depends on the horizontal and vertical directions of the digital signal representing the image I, in at least one sub-band of the digital signal, a geometric transformation identical to this quantizer is applied. For example if the quantizer is associated with a quantization step table, the geometric transformation is applied to this quantization step table.

A step E20 of entering, in the compressed file, two indicators Ih, Iv representing the normal or reversed order of the symbols respectively in the two directions of the digital image I is implemented.

This indicator is in the form of an additional bit having a first value, for example 0, representing a normal order of the symbols associated with the coefficients of the signal of the frequency sub-bands in a direction associated with, the indicator. The value of this indicator is reversed, and equal to 1 for example, when the order of the symbols is reversed with respect to that obtained by the spectral decomposition.

For the image of dimension 2, two indicators are entered in the compressed file F, the first indicator Ih associated with the horizontal direction and, a second indicator Iv associated with the vertical direction of the digital signal S.

The following table illustrates, according to the different rotations applied to the image I, the new values of the indicators Ih and Iv which are entered in the compressed file as a function of the initial values Ih and Iv.

The bit which is the inverse of bit 1 is hereinafter denoted inv(I), that is to say inv(1)=0 and inv(0)=1.

The rotations are indicated in the clockwise direction.

| Transformation | Ih entered | Iv entered |
| --- | --- | --- |
| Identity | Ih | Iv |
| Rotation through 90 degrees | inv(Iv) | Ih |
| Rotation through 180 degrees | inv(Ih) | inv(Iv) |
| Rotation through 270 degrees | Iv | inv(Ih) |

It is practical to consider that the value 0 represents a normal order of the symbols and thus to enter the following values for the indicators Ih and Iv in the compressed file with the image I:

| Transformation | Ih entered | Iv entered |
| --- | --- | --- |
| Identity | 0 | 0 |
| Rotation through 90 degrees | 1 | 0 |
| Rotation through 180 degrees | 1 | 1 |
| Rotation through 270 degrees | 0 | 1 |

A coding step E21, for example an entropic coding, is next implemented, and then the compressed file containing the image, possibly modified geometrically, and the associated indicators, is formed in a formation step E22.

This compressed file is thus stored in a non-volatile memory 25 of the photographic apparatus 20 with a view to subsequent display of the stored images.

By virtue of the present invention, all the images I taken by the apparatus 20 are stored in different orientations which correspond to a convenient display orientation.

When these images are displayed, at the time of decoding, the digital signal to be decoded will have been transformed geometrically with respect to the initial signal S.

The patent application FR 98 10734 in the name of the Applicant is incorporated by reference in the present description with regard to the decoding of such an image modified geometrically at the time of coding.

The decoding method includes first of all, in a conventional fashion, an entropic decoding step, the reverse of the entropic coding step E21 of the coding method described above, and a dequantization step, the reverse of the quantization step E11 of the coding method.

A first direction of the image, for example the horizontal direction, is next envisaged.

A reading step makes it possible to read the indicator Ih representing a normal or reversed state of the coefficients of the frequency subs bands in the horizontal direction of the digital signal.

It is tested whether the order of the coefficients is reversed, for example by verifying whether the value of Ih is equal to 1.

In the affirmative, the synthesis filters used for effecting a reverse spectral transformation on the coded image I are made symmetrical. In addition, a shifting of the synthesis filters by one index may be necessary when the digital signal to be reconstructed is even.

The symmetrisation and shifting of the synthesis filters correspond to a transformation of the original spectral recomposition filters in the horizontal direction as a function of the parity of the digital signal and the value of the indicator Ih.

For each synthesis filter, whether or not the order of the coefficients is reversed, the parity of the spectral recomposition filter is next calculated and a conventional symmetrical extension processing is applied to the ends of the digital signal which is a function of the parity of the spectral recomposition filter, the parity of the signal and the value of the indicator Ih.

All these steps are next reiterated for the other direction, the vertical direction, of the image to be decoded using the value of the indicator Iv.

The decoding method next includes a step of spectral recomposition of the digital signal which makes it possible to obtain as an output an image correctly oriented on the display screen.

The present invention thus makes it possible to transform a digital image geometrically at the time of its coding, minimising the complexity of the calculations and the memory space necessary for this geometric transformation.

It is particularly well suited to being implemented in a digital photographic apparatus having a "slide show" mode in which all the images are displayed one after the other on a screen, all in the same direction, whilst the user takes at least two types of photograph, some with the apparatus horizontal, the others with the apparatus vertical.

As the slide show progresses, certain images will be displayed askew. The geometric orientation modification method according to the invention makes it possible to effect a rotation of the images when they are coded and thus store them in different orientations in a memory of the apparatus 20.

Naturally, numerous modifications can be made to the example embodiment described above without departing from the scope of the invention.

Thus the spectral transformation used could also be a discrete cosine transform (DCT). One technique making it possible to modify the orientation of the image after spectral transformation thereof is described in detail, for example, in the article "A new family of algorithms for manipulating compressed images" by Brian C. Smith, Lawrence A. Rowe, IEEE Transactions on Computer Graphics and Applications, September, 1993, and in U.S. Pat. No. 5,751,865 (Felice A. Micco, Martin E. Banton).

In addition, the entropic coding step E21, could if necessary be, at least partially, implemented before the geometric transformation of the image, the symbols transformed thereafter then being entropic codes associated respectively with the coefficients of the sub-band signal obtained by spectral decomposition. Modification of the geometric orientation of the image can be effected on these entropic codes when the entropic coding used at the time of coding is for example a Huffman coding.

Conversely, if the quantization techniques used during the coding of the signal do not associate a quantization symbol with each sub-band coefficient, the symbols to which the geometric transformations applied are then directly the coefficients of the sub-band signal obtained by a spectral decomposition of the image I. Such is the case notably when the coding uses a technique of vector quantization of the digital signal decomposed into frequency sub-bands.

What is claimed is:

1. A method of modifying the geometric orientation of a digital image in an image acquisition apparatus adapted to acquire an image from at least one of a plurality of different orientations and to store the image in a form of a compressed file, said method comprising the steps of:
   acquiring the image in a chosen orientation;
   identifying the chosen orientation;
   converting the image into a digital image;
   spectral transforming the digital image;
   determining a geometric transformation to be applied to the image acquired as a function of the chosen orientation;
   applying the determined geometric transformation to symbols associated with spectral coefficients issuing in said in spectral transforming step;
   recording in the compressed file two indicators representing a normal or reversed order of the symbols respectively in two directions of the digital image; and
   coding the digital image in the compressed file.

2. A geometric orientation modification method according to claim 1, further comprising the step of quantizing the spectral coefficients before said step of applying the geometric transformation, the symbols being quantization symbols.

3. A geometric orientation modification method according claim 1, wherein the spectral transformating performed in said spectral transforming step is a multiresolution decomposition, such as a wavelet spectral decomposition.

4. A geometric orientation modification method according to claim 1, wherein said step of identifying the chosen orientation is implemented by an automatic orientation detector incorporated in the image acquisition apparatus.

5. A geometric orientation modification method according to claim 1, wherein said step of identifying the chosen orientation is implemented by a manual orientation selector incorporated in the image acquisition apparatus.

6. A geometric orientation modification method according to claim 1, wherein the image acquisition orientation is chosen from amongst a rotation through 90 degrees, a rotation through 180 degrees or a rotation through 270 degrees.

7. A geometric orientation modification method according to claim 1, wherein the spectral transforming performed in said spectral transforming step is a multiresolution spectral decomposition, such as a wavelet spectral decomposition, and includes a step of transpositioning a frequency sub-band having coefficients of low frequency in a first direction of the digital image and of high frequency in a second direction of the digital image with a frequency sub-band of the same resolution level in the spectral decomposition, having coefficients of high frequency in the first direction and of low frequency in the second direction when the geometric transformation comprises a rotation through 90 degrees or 270 degrees.

8. A geometric orientation modification method according to claim 1, further comprising a step of transpositioning the values of the height and width of the image when the geometric transformation applied comprises a rotation through 90 degrees or 270 degrees.

9. A device for modifying the geometric orientation of a digital image incorporated in an image acquisition apparatus adapted to acquire an image in accordance with at least one of a plurality of different orientations and to store the image in the form of a compressed file, said device comprising:
   means for acquiring the image in a chosen orientation;
   means for identifying the chosen orientation;
   means for converting the image into a digital image;
   means for spectral transforming the digital image;
   means for determining a geometric transformation to be applied to the image acquired as a function of the chosen orientation;
   means for applying the determined geometric transformation to symbols associated with spectral coefficients issuing from the spectral transformation performed by said spectral transforming means;
   means for recording in the compressed file two indicators representing a normal or reversed order of the symbol respectively in two directions of the digital image; and
   means for coding the digital image in the compressed file.

10. A geometric orientation modification device according to claim 9, further comprising means for quantizing the spectral coefficients adapted to quantize the spectral coefficients before application of the geometric transformation, the symbols being quantization symbols.

11. A geometric orientation modification device according to claim 9, wherein the spectral transformation performed by said spectral transforming means is a multiresolution spectral decomposition, such as a wavelet spectral decomposition.

12. A geometric orientation modification device according to claim 9, wherein said means for identifying the chosen orientation includes an automatic orientation detector incorporated in said image acquisition apparatus.

13. A geometric orientation modification device according to claim 9, wherein said means for identifying the chosen orientation includes a manual orientation selector incorporated in said image acquisition apparatus.

14. A geometric orientation modification device according to claim 9, wherein the image acquisition orientation is chosen from amongst a rotation through 90 degrees, a rotation through 180 degrees or a rotation through 270 degrees.

15. A geometric orientation modification device according to claim 9, wherein the spectral transformation performed by said spectral transforming means is a multiresolution spectral decomposition, such as a wavelet spectral decomposition, and in that it also comprises means for transpositioning a frequency sub-band having coefficients of low frequency in a first direction of the digital image and of high frequency in a second direction of the digital image with a frequency sub-band of the same resolution level in the spectral decomposition, having coefficients of high frequency in the first direction and of low frequency in the second direction when the geometric transformation comprises a rotation through 90 degrees or 270 degrees.

16. A geometric orientation modification device according to claim 9, further comprising means for transposing the values of the height and width of the image when the geometric transformation applied comprises a rotation through 90 degrees or 270 degrees.

17. A geometric orientation modification device according to claim 9, wherein said means for spectral transforming the digital image, said means for determining a geometric transformation, said means for applying the geometric transformation, said means for entering indicators in the compressed file, said coding means, and if applicable said quantization and transposition means, are incorporated in:
   a microprocessor,
   a read only memory containing a program for modifying the geometric orientation of the digital image, and
   a random access memory containing registers adapted to record variables modified during the running of the program.

18. An image processing method, implemented in an image acquisition apparatus, comprising the steps of:
   generating image data representing an image;
   wavelet-transforming the image data;
   quantizing the transformed data;
   entropically encoding the quantized data;
   identifying a correct orientation of the image represented by the image data, from among four possible orientations, as a function of the position of the image acquisition apparatus; and
   applying a geometric transformation to the transformed data in accordance with the result of the identification.

19. A method according to claim 18, wherein the image data are transformed into sub-bands corresponding to each of a plurality of resolution levels in said wavelet-transforming step.

20. A method according the claim 18, wherein said method further comprises the step of storing the information showing the result of the identification, and the encoded data.

21. An image processing apparatus, comprising:
   means for generating image data representing an image;
   means for wavelet-transforming the image data;
   means for quantizing the transformed data;
   means for entropically encoding the quantized data;
   means for identifying a correct orientation of the image represented by the image data from among four possible orientations, as a function of the position of said image processing apparatus; and
   means for applying a geometric transformation to the transformed data in accordance with the result of the identification.

22. An apparatus according to claim 21, wherein said wavelet-transforming means transforms the image data into sub-bands corresponding to each of a plurality of resolution levels.

23. An apparatus according to claim 21, wherein said apparatus further comprises means for storing the information showing the result of the identification, and the encoded data.

24. An image acquisition apparatus, wherein said apparatus has a geometric orientation modification device according to claim 9.

25. A digital photographic apparatus, wherein said apparatus has a geometric orientation modification device according to claim 9.

26. A digital camera adapted to function in a still image mode, wherein said camera has a geometric orientation modification device according to claim 9.

27. A storage means, readable by a microprocessor, wherein said storage means is adapted to implement the geometric orientation modification method according to claim 1.

28. A storage means, readable by a microprocessor, wherein said storage means is adapted to implement the image processing method according to claim 18.

29. A computer program product, loadable into a programmable processing apparatus, wherein said computer program product comprises software code adapted to execute the geometric orientation modification method according to claim 1.

30. A computer program product, loadable into a programmable processing apparatus, wherein said computer program product comprises software code adapted to execute the image processing method according to claim 18.

* * * * *

UNITED STATES PATENT AND TRADEMARK OFFICE
CERTIFICATE OF CORRECTION

PATENT NO. : 6,834,126 B1
DATED : December 21, 2004
INVENTOR(S) : Félix Henry et al.

It is certified that error appears in the above-identified patent and that said Letters Patent is hereby corrected as shown below:

Title page,
Item [56], References Cited, FOREIGN PATENT DOCUMENTS, "0982931" should read -- 0 982 931 --.

Column 3,
Line 61, "Thank" should read -- Thanks --.

Column 5,
Line 25, "a orientation" should read -- orientation --.

Column 7,
Line 2, "images I" should read -- images I, --;
Line 35, "users" should read -- user --; and
Line 55, "image 1" should read -- image I --.

Column 8,
Line 21, "$HL_1$," should read -- $HL_1$ --;
Line 24, "$HH_1$," should read -- $HH_1$ --; and
Line 26, "$LL_1$," should read -- $LL_1$ --.

Column 9,
Line 2, "byway" should read -- by way --;
Line 46, "with," should read -- with --;
Line 52, "and," should read -- and --; and
Line 58, "bit 1" should read -- bit I --.

Column 10,
Line 46, "subs bands" should read -- sub-bands --.

Column 11,
Line 15, "photograph," should read -- photographs, --; and
Line 67, "in" should be deleted.

UNITED STATES PATENT AND TRADEMARK OFFICE
CERTIFICATE OF CORRECTION

PATENT NO. : 6,834,126 B1
DATED : December 21, 2004
INVENTOR(S) : Félix Henry et al.

It is certified that error appears in the above-identified patent and that said Letters Patent is hereby corrected as shown below:

Column 12,
Line 10, "according" should read -- according to --; and
Line 11, "transforming" should read -- transforming --.

Signed and Sealed this

Twenty-third Day of August, 2005

JON W. DUDAS
*Director of the United States Patent and Trademark Office*